US007286131B2

(12) United States Patent
Brodie et al.

(10) Patent No.: US 7,286,131 B2
(45) Date of Patent: Oct. 23, 2007

(54) GENERATING AN APPROXIMATION OF AN ARBITRARY CURVE

(75) Inventors: Alexander S. Brodie, Redmond, WA (US); Karthik G. Anbalagan, Bellevue, WA (US); Samuel T. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 11/138,603

(22) Filed: May 26, 2005

(65) Prior Publication Data

US 2006/0267985 A1   Nov. 30, 2006

(51) Int. Cl.
*G06T 11/20* (2006.01)
*G06T 1/00* (2006.01)
*G06F 17/00* (2006.01)

(52) U.S. Cl. .................... 345/442; 345/441; 345/418

(58) Field of Classification Search ........ 345/440–443, 345/589, 593, 594, 690, 418; 382/168, 169, 382/274; 715/810, 863, 700
See application file for complete search history.

(56) References Cited

U.S. PATENT DOCUMENTS 5,739,809 A * 4/1998 McLaughlin et al. ....... 345/594

| 6,239,782 | B1 * | 5/2001 | Siegel ........................ 345/690 |
| 7,006,688 | B2 * | 2/2006 | Zaklika et al. .............. 382/169 |
| 7,039,876 | B2 * | 5/2006 | Lavendel et al. ........... 715/810 |
| 2003/0012437 | A1 * | 1/2003 | Zaklika et al. .............. 382/274 |
| 2005/0163368 | A1 * | 7/2005 | Hanamoto .................. 382/168 |
| 2006/0066628 | A1 * | 3/2006 | Brodie et al. ............... 345/594 |

OTHER PUBLICATIONS

Godenthal, Rony and Bercovier, Michael, "Spline Curve Approximation And Design By Optimal Control Over The Knots Using Genetic Algorithms", International Congress on Evolutionary Methods for Design, Optimation and Control with Applications to Industrial Problems, 2003, pp. 1-18.*

* cited by examiner

*Primary Examiner*—Chante Harrison
(74) *Attorney, Agent, or Firm*—Shook, Hardy & Bacon, LLP

(57) ABSTRACT

A system and method for generating an approximation of an arbitrary or user-editable curve. One or more controls associated with a control curve are provided, and a user input related to the alteration of the control curve is received. A method to generate an approximation of the control curve, as altered, is performed. The method defines candidate approximations and selects a plurality of those candidates. The method utilizes characteristics of the selected candidates to create new candidate approximations. Optionally, at least a portion of the method is repeated until a candidate approximation acceptably represents the control curve.

18 Claims, 12 Drawing Sheets

GENERATING AN APPROXIMATION OF AN ARBITRARY CURVE

CROSS-REFERENCE TO RELATED APPLICATION

Not applicable

STATEMENT REGARDING FEDERALLY SPONSORED RESEARCH OR DEVELOPMENT

Not applicable

BACKGROUND

Computer software applications today provide a wide variety of controls that allow users to perform even relatively complex manipulations of content. For example, the field of graphics processing applications, including image-processing packages, has broadened and matured to a point where many image processing programs and tools permit a user to selectively adjust an array of image characteristics. Broadly speaking, many of these image-editing tasks revolve around altering the color composition of a digital photograph or other image, or the exposure or lighting characteristics of the subject image or file. Within each category of task, commercially available programs typically offer the user a number of tools that can be activated by sliders, graphs or other interface objects. For instance, image processing packages exist which permit a user to change the relative amounts of red, green or blue (RGB) components or cyan, magenta, yellow or black (CMYK) component colors in the pixels of an image, for instance by sliding those buttons to the left or right.

However, providing a user control over complex manipulations of content presents various difficulties or compromises. For one, software applications today do not include acceptable means for implementing user-altered parameters. For example, with respect to digital image manipulation, an arbitrary curve may be generated by a user's alterations of light and exposure parameters. Presently, software applications are unable to correctly approximate such an arbitrary curve and, thus, the usefulness of the control set is compromised. Moreover, performing a sequence of tasks to achieve a desired overall effect on a piece of content may require that the user learn an extensive set of skills in that particular application, remember the sequence which they have performed and be able to informally predict the results of the next step or editing option. Users may not therefore be able to be as productive in carrying out those time-consuming manual tasks, and the results may still not conform to the user's intended editing objectives.

SUMMARY

The present invention meets the above needs and overcomes one or more deficiencies in the prior art by providing systems and methods for generating an approximation of an arbitrary or user-defined curve. In one embodiment, one or more controls associated with a control curve are provided, and a user input is received related to the alteration of the control curve. A method to generate an approximation of the control curve, as altered, is performed. The method defines candidate approximations and selects a plurality of those candidates. The method utilizes characteristics of the selected candidates to create new candidate approximations. Optionally, at least a portion of the method is repeated until a candidate approximation acceptably represents the control curve.

Another aspect of the present invention provides a computer system for implementing an editable control curve. A user interface component is provided that presents a set of editing controls. The user interface is configured to receive user inputs related to alteration of the editable control curve. A curve approximation engine is also provided. The engine is configured to generate an approximation of the editable control curve in response to the user input altering the control curve.

A further aspect of the present invention provides a computer-implemented method for generating a curve that approximates a defined shape. A set of candidate curves is defined. The method defines a set of fitness criteria for evaluating how acceptably a candidate curve approximates the defined shape. One or more stop conditions are defined. The stop conditions indicate that at least one of the candidate curves acceptably approximates the defined shape. The fitness criteria are used to select the candidate curves that most acceptably approximate the defined shape, and the candidate curves that were not selected are eliminated from the set of candidate curves. A plurality of new candidate curves are generated and added to the set of candidate curves. To generate the new candidate curves, characteristics of the selected curves are utilized. At least a portion of the method is repeated until one of the stop conditions is satisfied.

BRIEF DESCRIPTION OF THE DRAWINGS

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides improved systems and methods for generating an approximation of an arbitrary or user-defined curve. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
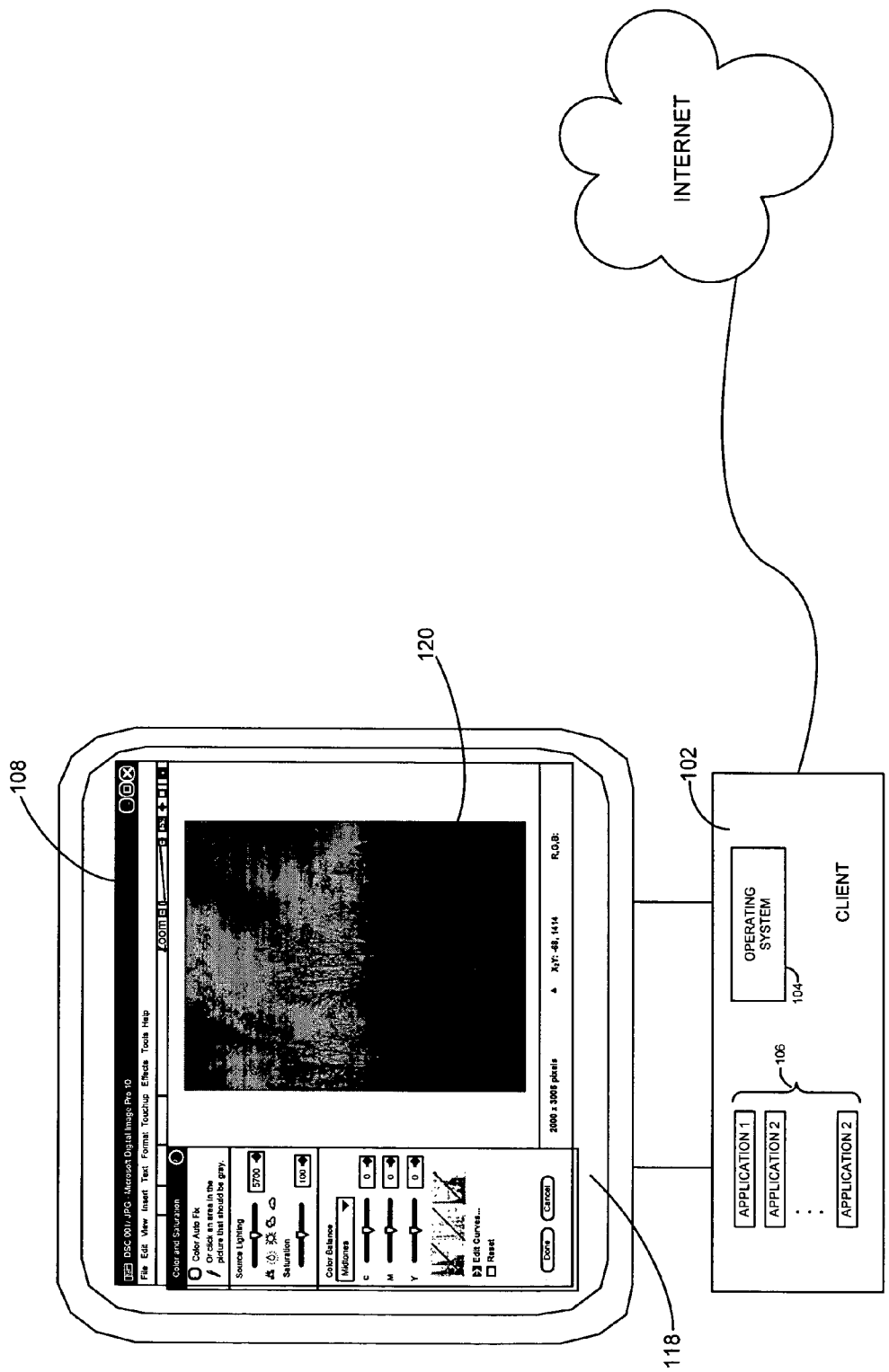
FIG. 1 illustrates an environment in which a system and method for controlling dynamically interactive parameters for processing may operate, according to embodiments of the invention.

FIG. 1 illustrates an architecture in which a system and method for providing controls optimized for use with user-editable curves may operate, according to an embodiment of the invention. As illustrated in that figure, a user may operate a client 102 using a user interface 118, such as a graphical user interface, under control of an operating system 104 such as the Microsoft Windows® family of operating systems, or others. The client 102 may contain or host an installed or downloaded set of applications 106, such as word processing, Web browsing, or with regard to aspects of the invention, a processing application 108. Client 102 so equipped and configured may be or include, for example, a personal computer, a workstation, a personal digital assistant, a network-equipped cellular phone or other device, machine or client. Client 102 may be configured with Internet or other network connectivity, or in other embodiments may be configured or operate in a stand-alone or non-networked mode.

Figure 2:
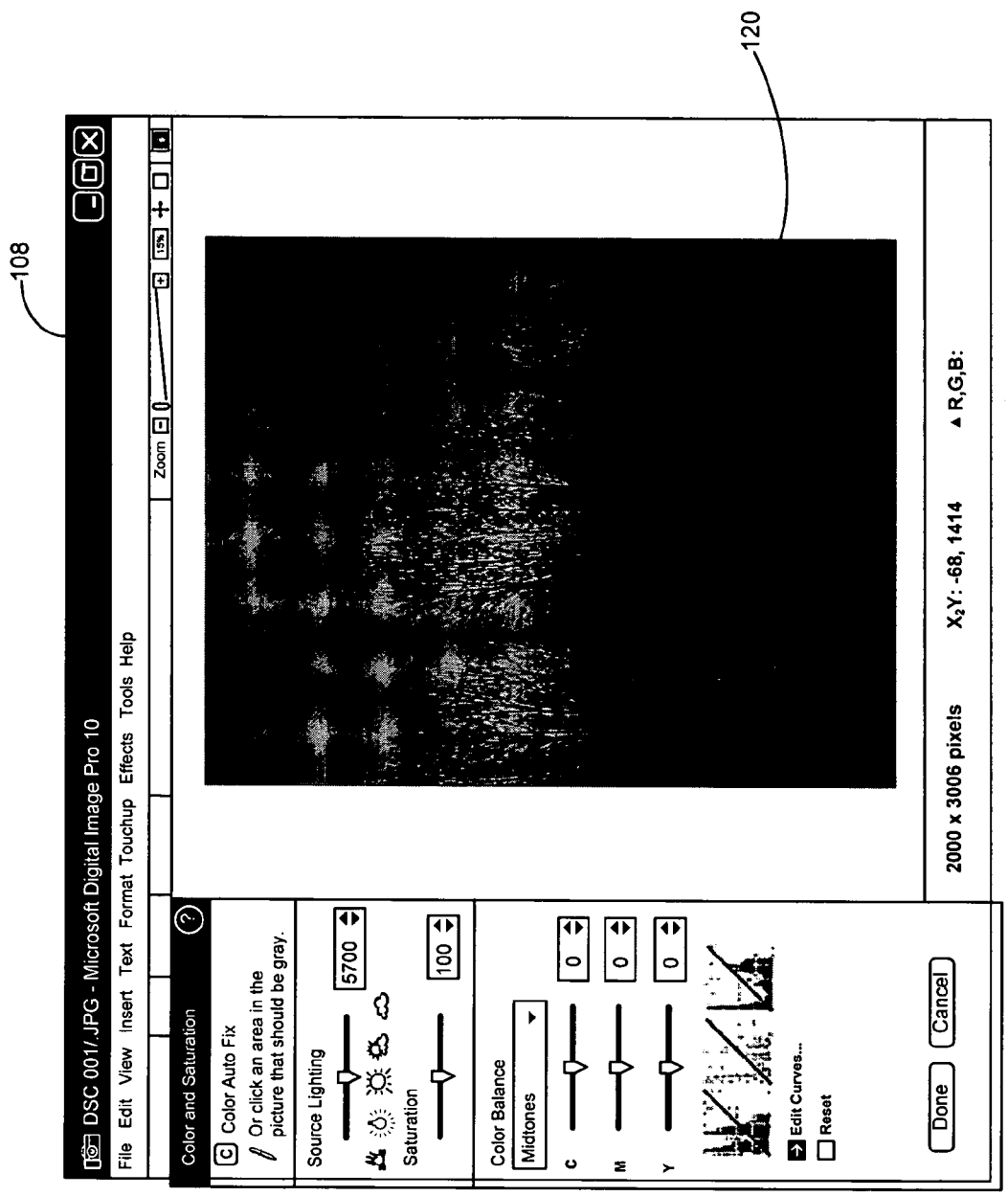
FIG. 2 illustrates a color editing interface, according to embodiments of the invention.

According to one embodiment of the invention in one regard, and as further illustrated for example in FIG. 2, the user may invoke the content processing application 108 to open a digital photograph or other image 120 or other file or content to perform editing and image manipulation tasks. Those tasks may include, for example, opening an image, rotating an image, resizing an image, printing an image, emailing an image or performing other functions or tasks. More particularly, according to exemplary embodiments of the invention the user may choose to operate content processing application 108 to manipulate the content and composition of the image 120, to improve or edit the quality or appearance of that image. Image 120 may be or include, for example, digital photographs or other images or content, for instance stored in joint photographic experts group (.JPG), tagged image file format (.TIFF), graphics interchange format (.GIF), bit map (.BMP), or other files or formats.

According to one embodiment of the invention, the editing functions presented in processing application 108 may be grouped into a set of global processing tasks. For imaging applications, those comparatively high-level modes or activities may include, for example, a first set of color correction or editing functions, a second set of exposure correction or editing functions, or other global tasks. The modal user dialogues and other tools shown in FIG. 2 illustrate, for example, a corresponding set of color editing functions as a global task.

Figure 3:
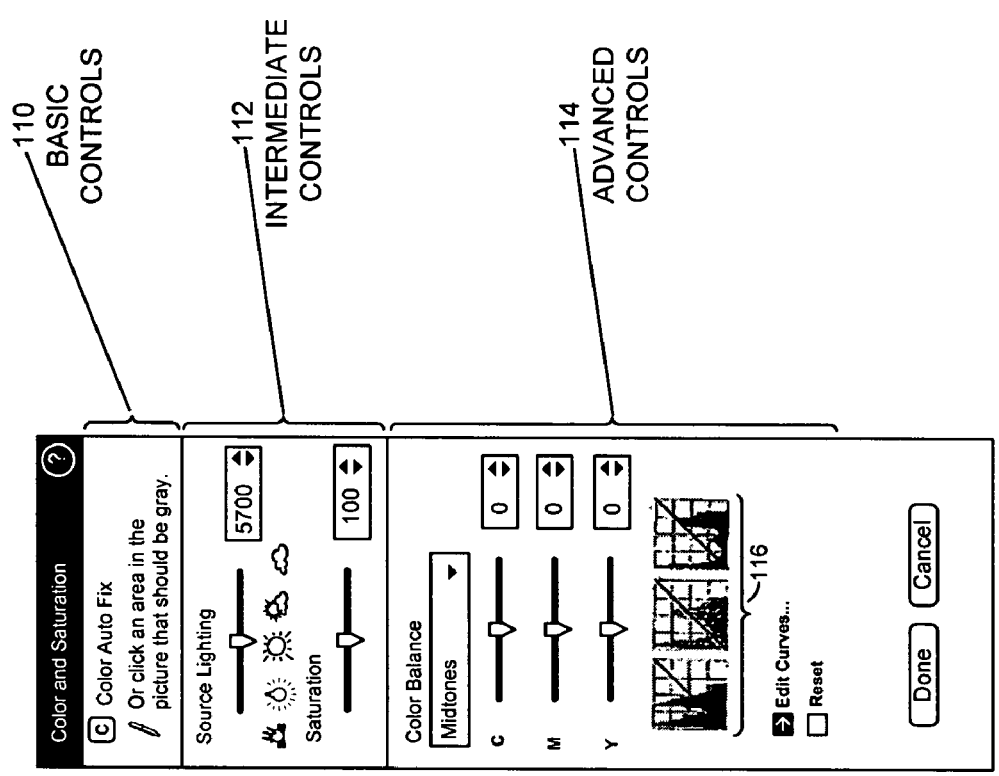
FIG. 3 illustrates a color editing interface including a variety of levels of controls, according to one embodiment of the invention.

As illustrated in FIG. 3, the set of global color editing tasks may be broken down or presented as a hierarchy of selectable tools or controls. As shown in that figure, that hierarchy of controls may be or include, for example, basic controls 110, intermediate controls 112 and advanced controls 114. Other hierarchies, levels or groupings are possible. In an embodiment illustratively shown, basic controls 110 may be or include, for instance, a color automatic fix button or other one-click or other correction option, as well as, for instance, a gray-color eyedropper tool to alter the color temperature of sections of image 120 to gray-scale or other grayed color casts. Other buttons, controls and variables for the basic level are possible.

Intermediate controls 112 as illustrated may be or include, for example, a set of slider buttons or bars to adjust image parameters such as the color temperature or other characteristics of source lighting, as well as color saturation of the overall image 120. Other buttons, controls and variables for the intermediate level are possible. Advanced controls 114 as illustrated may be or include, for example, a set of slider buttons for color components such as cyan, magenta, yellow, black (CMYK), red, green, blue (RGB) or other variables. Other buttons, controls and variables for the advanced level are possible, such as a set of editable curves 116 such as color or other histograms, gamma correction curves, or other curves or functions, which may include selectable or moveable curve lines, as shown. Further variables which may be presented at the intermediate, advanced or other levels may include for instance hue controls, red-eye controls, color bit depth controls and white-balance controls. Similarly configured hierarchical sets of controls are possible, for example, for other global image processing tasks or modes such as for exposure correction, or others as discussed below.

Figure 4:
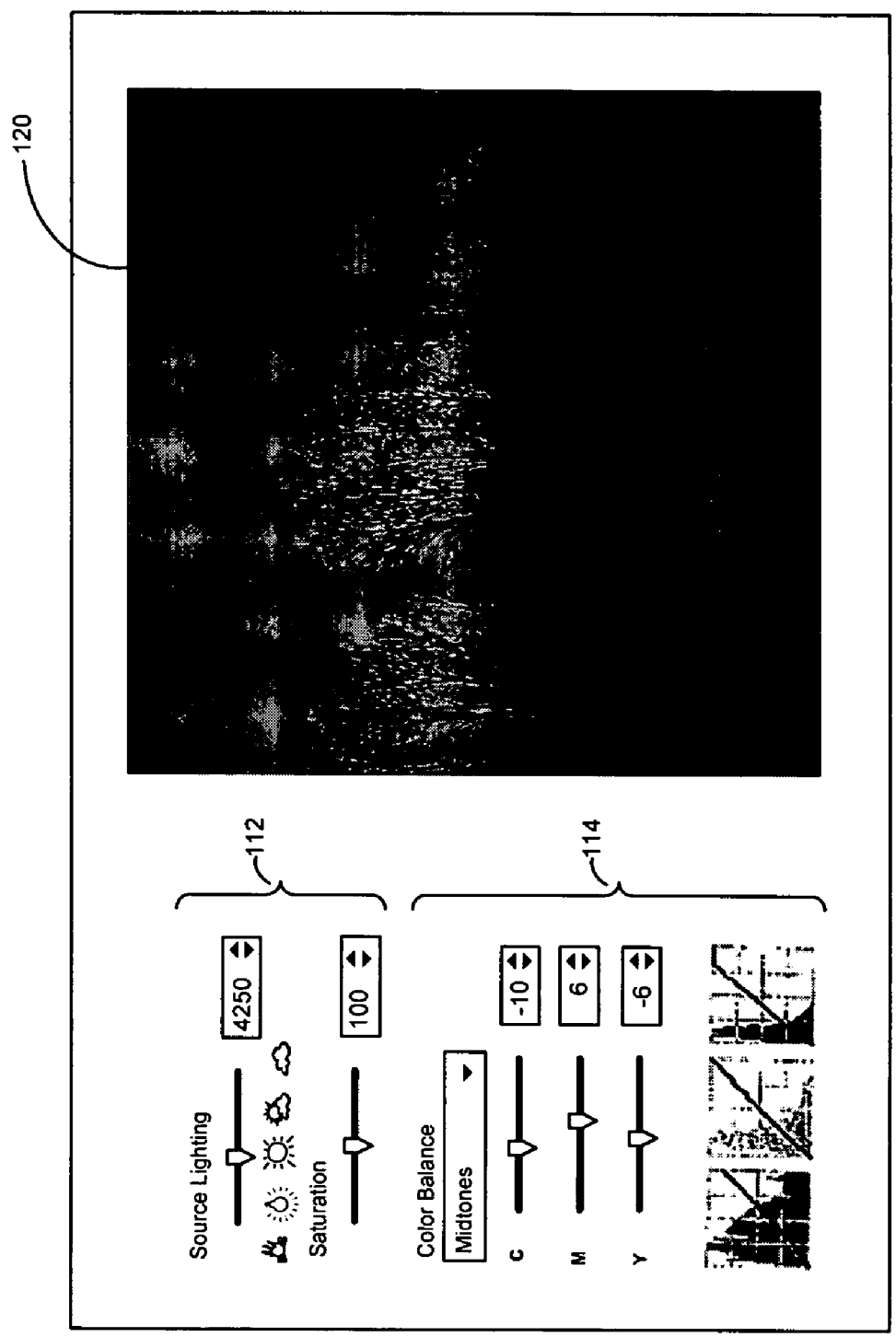
FIG. 4 illustrates a color editing interface including color balance controls and a set of editable curves, according to one embodiment of the invention.

According to an embodiment of the invention in a further regard, and as for example illustrated in FIG. 4, when individual controls or image processing parameters are manipulated at any one or more of the levels of the hierarchy of controls presented in processing application 108, a coordinated or linked adjustment of other associated variables may automatically take place. That is, and as for example shown in FIG. 4, when a user manipulates an auto-fix or one-click option in basic controls 110 to correct or adjust for instance overall color in image 120, the processing application 108 may automatically analyze image 120 and correct the color content of that image based on one or more parameters. In one embodiment, the processing application 108 may, for example, respond to the user's auto-fix selection by detecting a color temperature of image 120. The processing application 108 may also determine that the color temperature of the image 120 is warm and incandescent, which might translate for example to a color temperature of approximately 2500-2900 degrees Kelvin or other ranges.

The processing application 108 may in response to that detected color temperature value or range automatically move or adjust a source lighting slider, acting as a color temperature control, in intermediate controls 112 to the left towards the light bulb icon, to adjust the presented color temperature range of image 120 on user interface 118. Sequentially or simultaneously, the processing application 108 may automatically adjust the color balance sliders such as controls representing cyan, magenta and yellow (CMY, black optional but not shown) components to remove a degree of red color (−10), add a degree of green color (+6) and remove a degree of blue color (−6), as shown. Other combinations and adjustments are possible, in linked or parametric fashion.

According to an exemplary embodiments of the invention in a further regard, and as likewise illustrated in FIG. 4, when color content or other automatic or compensating adjustments are made, those changes may be automatically and immediately reflected in the action of intermediate controls 112 and advanced controls 114, including to show deformation or alteration in the set of editable curves 116 depending on changes in color parameters.

Figure 5:
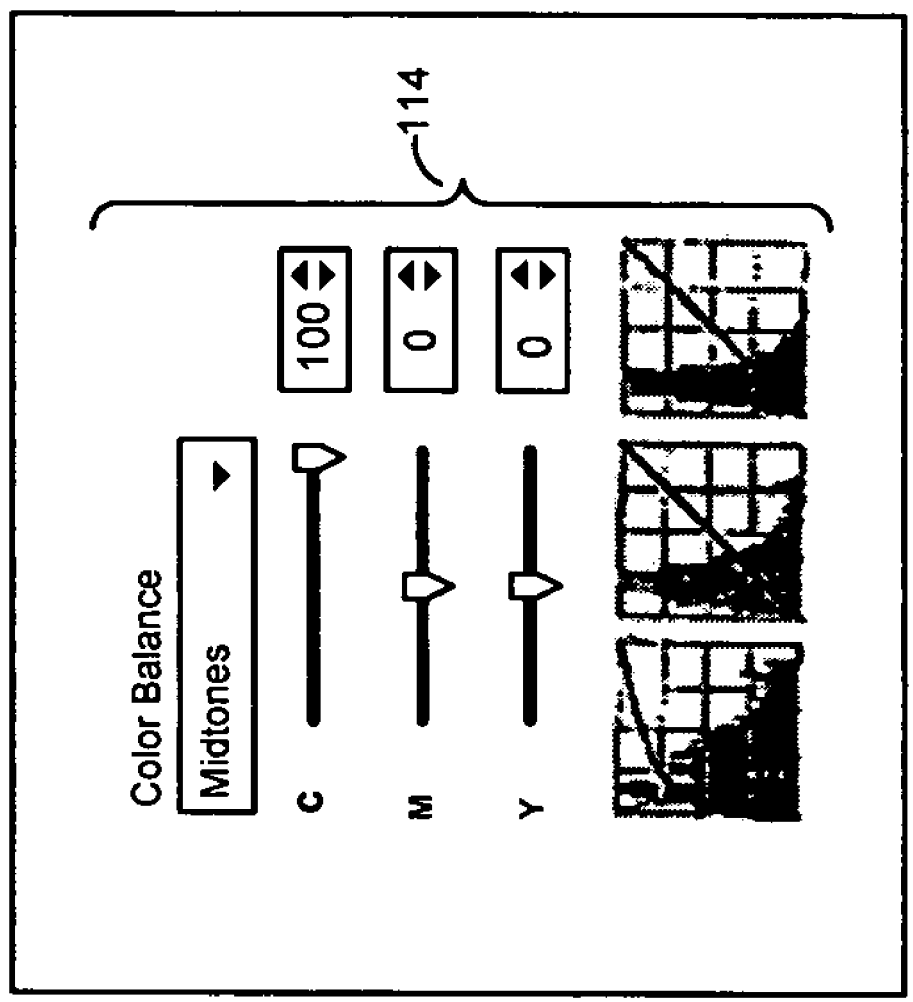
FIG. 5 illustrates a color editing interface including color balance controls and a set of editable curves in another regard, according to one embodiment of the invention.

It may be noted that according to certain embodiments of the invention in another regard, when a user elects to make manual changes to individual variables such as by sliding individual slider bars or otherwise, that automatic corresponding changes to other sliders, controls, the set of editable controls 116 or other interface elements may also be automatically presented to the user. Thus, and for example as illustrated in FIG. 5, when one or more color component (CMY or other) sliders for example within intermediate controls 112 are moved by the user, the set of editable curves 116, such as a color histogram or other curve or function, may be automatically updated and presented to the user, in on-the-fly fashion.

Figure 6:
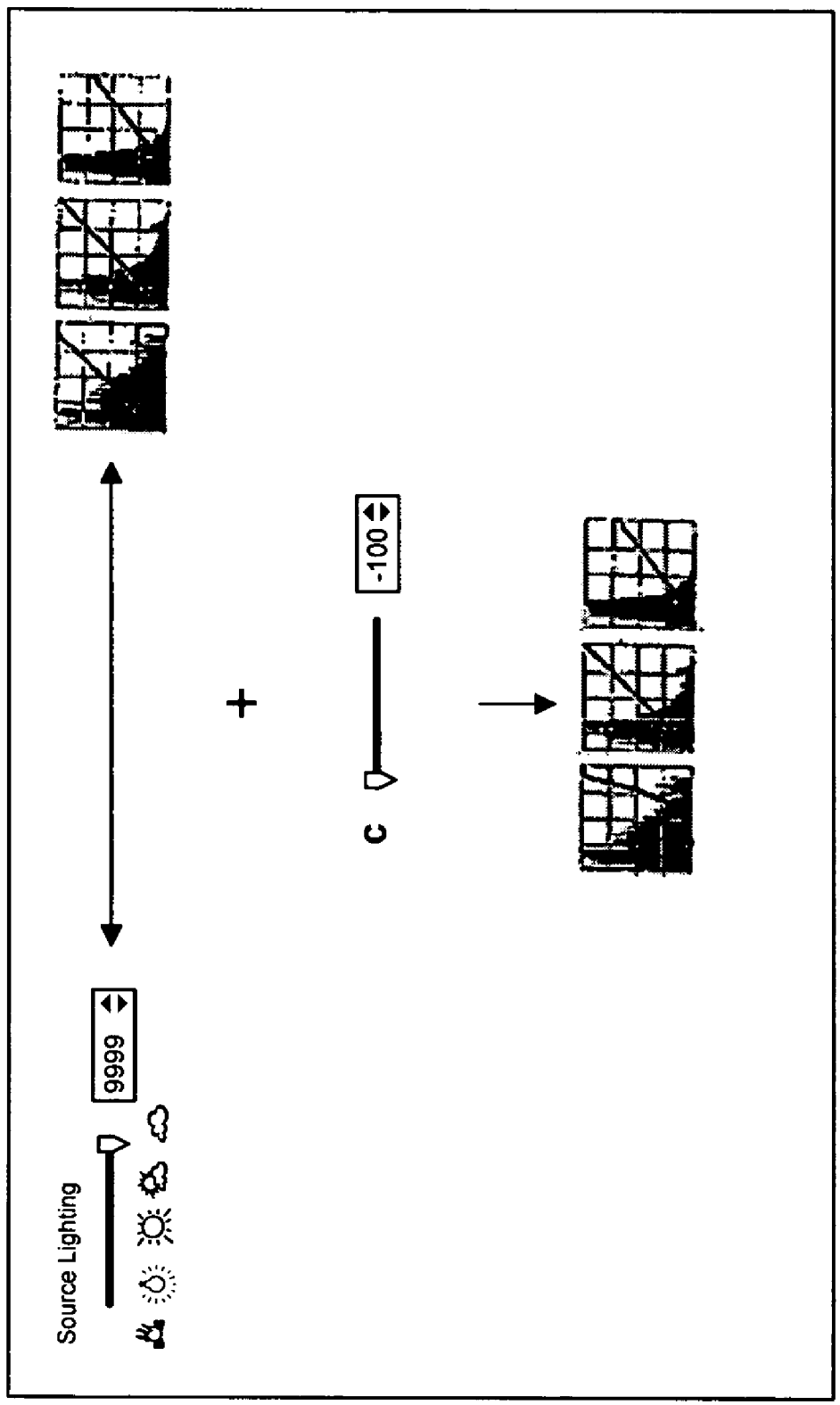
FIG. 6 illustrates a set of color controls and additive adjustment interaction, according to one embodiment of the invention.

According to the interactivity aspect of the invention in another regard, and as illustrated in FIG. 6, the interactive linkage or coupling between any two or more image parameters may be employed to be additive. That is, as shown, an adjustment to source lighting in intermediate controls 112 may cause a dynamically interactive, automatic alteration to the set of editable curves 116. In the event that action is followed by an adjustment to a color slider (cyan as illustrated) in advanced controls 114, that action may similarly result in a dynamic or automatic further adjustment to the histograms or other curves or functions in the set of editable curves 116. Other combinations, sequences and resulting parametric adjustments are possible.

Figure 7:
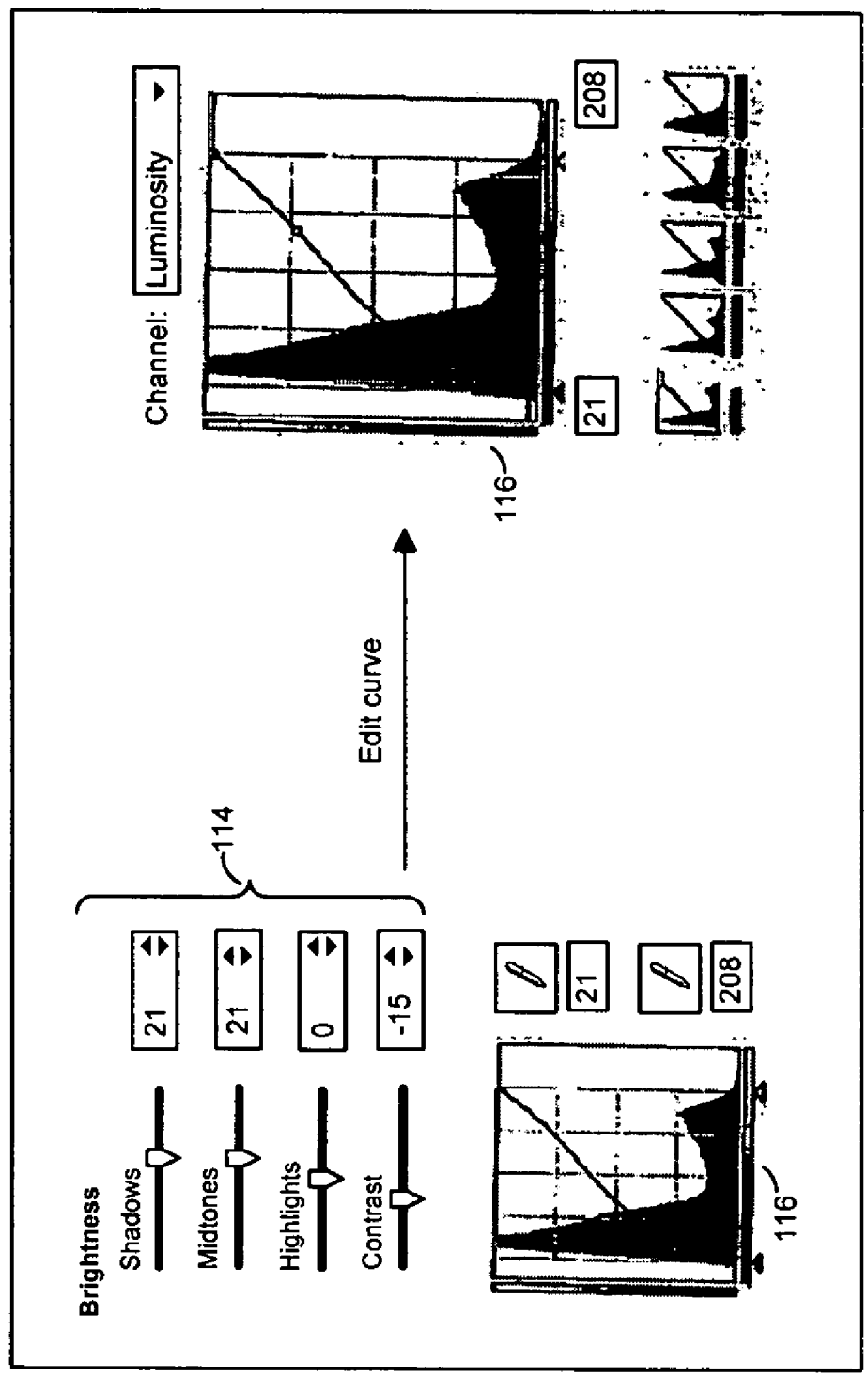
FIG. 7 illustrates a color editing interface including a curve editing action, according to one embodiment of the invention.

It may be noted again, and as illustrated in FIG. 7, that the set of global image processing tasks may include other high-order task groupings or modes, besides color modification itself. As illustrated in that figure, those other global modes may include global exposure editing or correction. That mode may include a set of hierarchical controls including basic controls (not shown, but which may for example include one-button exposure controls), intermediate controls (not shown, but which may for example include luminance slider bars) as well as advanced controls 114, which may include a set of editable curves 116 and other advanced controls, to manipulate the exposure quality of image 120. Other exposure hierarchies, controls and variables are possible, such as low-light compensation controls, backlight controls and gain controls. Other global image processing task-oriented modes are likewise possible.

Figure 8:
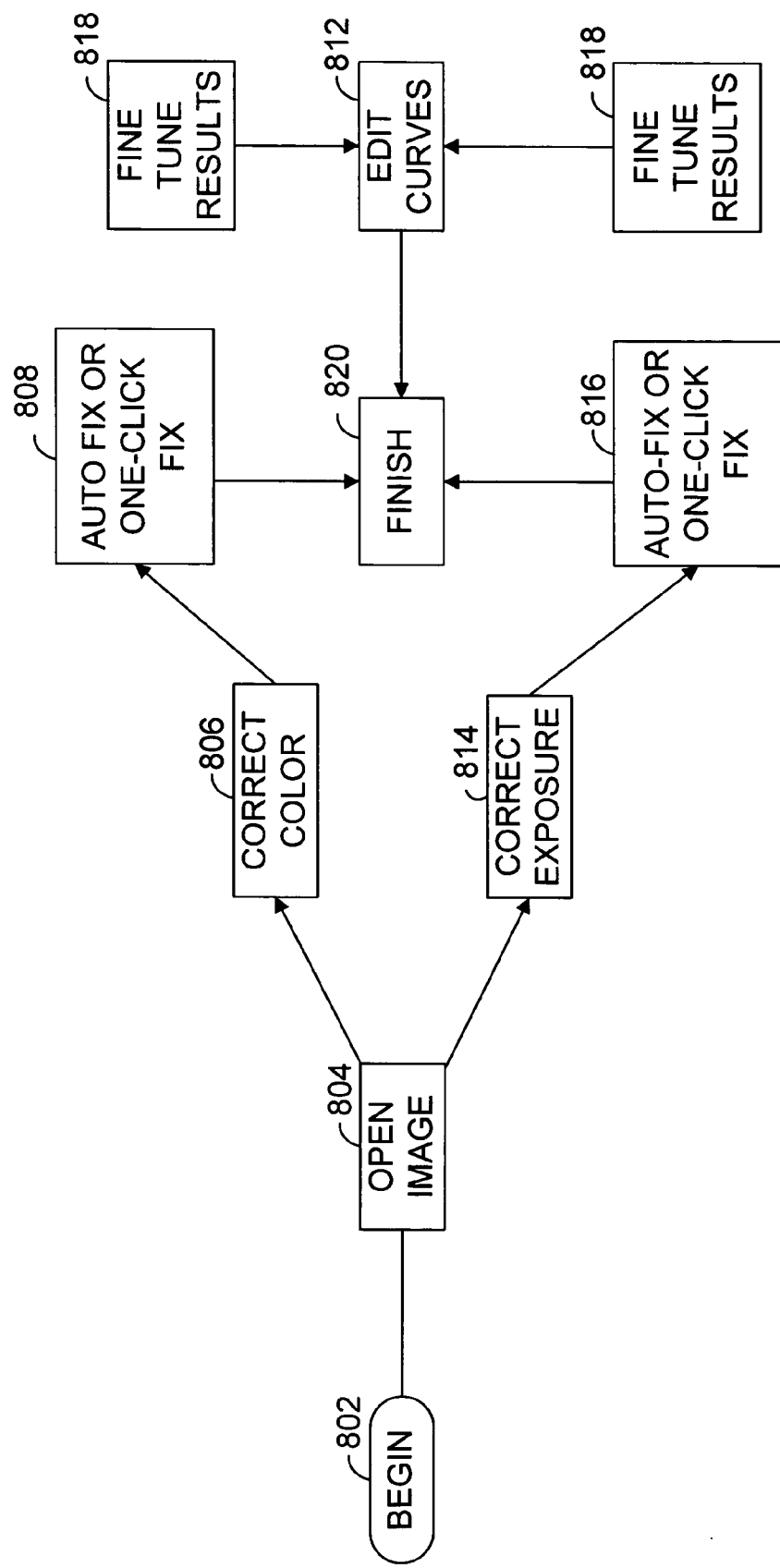
FIG. 8 illustrates a flowchart of overall interactive image processing, according to one embodiment of the invention.

FIG. 8 illustrates overall processing of dynamically interactive controls, according to one embodiment of the invention. In step 802, processing may begin. In step 804, an image file or other image source may be opened or accessed by processing application 108 or other application or resource, to open an image 120 or other content. In step 806, a user may select an option to correct, for example, the color composition of the subject image 120. In step 808, the user may select for instance to activate an automatic fix, or one-click color correction option, for instance by clicking a button in or otherwise using basic controls 110. If the user elects to activate an automatic fix, the processing application 108 may apply default, selected or calculated adjustments to color content, for instance to bring color temperature in line with typical indoor lighting, reduce saturation or otherwise manipulate the subject image 120 or other file or content. According to an exemplary embodiment, those composite adjustments may be made transparently to the user, and may include dynamically interactive parameters in the execution of that automatic adjustment. Following step 808, if the image editing results are satisfactory processing may proceed to step 820 where editing may finish and processing may repeat, return to a prior processing point, jump to a further processing point or end.

If after any automatic adjustments made in step 808 the user wishes to continue editing, in step 810 the user may elect to fine-tune the results of the automatic image adjustment, for example by operating slider bars or other tools or resources of intermediate controls 112 or otherwise to adjust relative amounts of cyan, magenta, yellow or black (CMYK) or make other adjustments or modifications. Those fine-tuning adjustments may themselves include dynamically interactive adjustments between active parameters. In step 812, the user may further manipulate advanced controls 114, such as the set of editable curves 116 which may include, for example, histogram, gamma curves or other curves or functions. The manipulation of editable curves 116 may also involve automatic interaction between color parameters. Following step 812, processing may process to step 820 where editing may finish and processing may repeat, return to a prior processing point, jump to a further processing point or end.

Following step 804, in step 814 the user may likewise choose to activate a set of exposure correction resources or tools, instead of, before or after applying any color correction or editing tools or steps. In step 816, the user may select or activate an automatic or one-click type of correction option for exposure purposes, for example by activating a one-click button in basic controls 110 or otherwise. The automated exposure adjustments may in one regard be dynamically interactive. In step 818, the corrected exposure results may be fine-tuned or adjusted, for example by manipulating slider controls or other activatable objects or controls in intermediate controls 112 such as brightness or exposure tools, or otherwise. Such intermediate adjustments may be likewise dynamically interactive, depending on the tools or parameters being adjusted or controlled. In step 812, the user may likewise manipulate a set of editable curves 116, for instance within advanced tools 114, to alter exposure parameters, which parameters may similarly be dynamically interactive or linked. Processing may then proceed to step 820 where editing may finish and processing may repeat, return to a prior processing point, jump to a further processing point or end.

Figure 9:
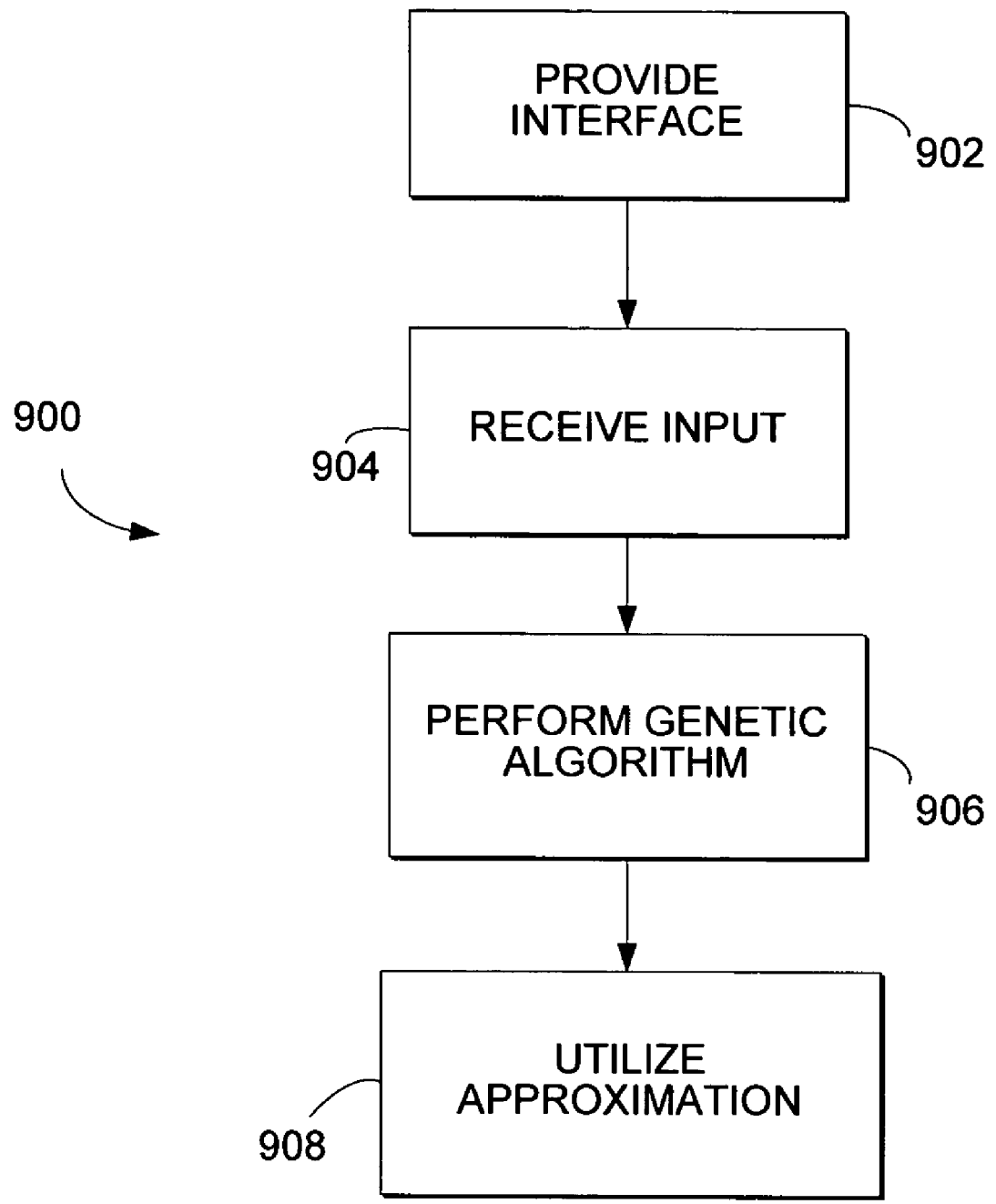
FIG. 9 illustrates a flowchart showing a method for generating an approximation of a user-altered shape or curve in accordance with one embodiment of the present invention.

FIG. 9 illustrates a method 900 in accordance with the present invention wherein a processing application is configured to generate a curve that approximates a user-altered shape or curve. At 902, the method 900 provides a user interface having one or more controls associated with an editable curve, and at 904, a user input is received by the user interface. The received input may relate to the alteration of the editable curve. As previously discussed, various embodiments of the present invention provide controls in which a user may define the shape of a curve associated with various editing parameters. For example, the present invention allows a user to manipulate a set of editable curves. Such manipulations may result from manual tweaks to lighting and exposure parameters associated with a digital image. In sum, the interface presented by the method 900 may provide any number of input options related the manipulation of editable parameters and control curves.

As will be understood by those skilled in the art, the approximation created by the method 900 allows generation of a curve that is user-editable. The altered curve may be generated in any way, using any number of mathematical or non-mathematical techniques. For example, a user may choose to draw the curve. In one embodiment, the approximation provides a portion of an interface for further manipulations of the curve. Though this interface, additional flexibility and control over content manipulation may be afforded the user. The approximation curve may take on any number of formats and may utilize any number of interpolation techniques are known in the art. For example, the approximation curve may take the form of a spline. As will be appreciated by those skilled in the art, a spline is a type of curve that is defined piecewise by polynomials. One type of spline that may be especially well suited for use with the present invention is a cubic spline. In one embodiment of the present invention, a cubic spline curve is used to present users with a familiar control for manipulating a curve using various control points.

To generate an approximation that optimally matches the user-altered curve, the method 900 performs a genetic algorithm at 906. As known to those skilled in the art, a genetic algorithm is a heuristic that applies principles of evolutionary biology to numerical problems. Such biological principles may include inheritance, mutation, natural selection and recombination (or crossover). It should be noted that many different implementations of genetic algorithms are acceptable for use with the present invention. Further, the foregoing description of genetic algorithms is provided as a background and is not meant to limit the present invention to a particular set of operations.

To perform the genetic algorithms, a set of candidate solutions (called "organisms") is defined. The set of organisms may be referred to as the "population." The evolution of the candidate solutions starts from the population of initial organisms. In each successive generation, the fitness (i.e. closeness to the desired result) of the whole population is evaluated, multiple individual organisms are stochastically selected from the current population (based on their fitness), modified (e.g. mutated or recombined) to form a new population, which becomes current in the next iteration of the algorithm. The algorithm proceeds until an acceptable or optimal solution within the population is identified.

Once an optimal approximation is generated, at 908 the method 900 utilizes this approximation to apply the user-altered curve to editing application and controls. As previously discussed, the approximation may be used to implement the user-altered curve and to apply this curve to the content being edited.

Figure 10:
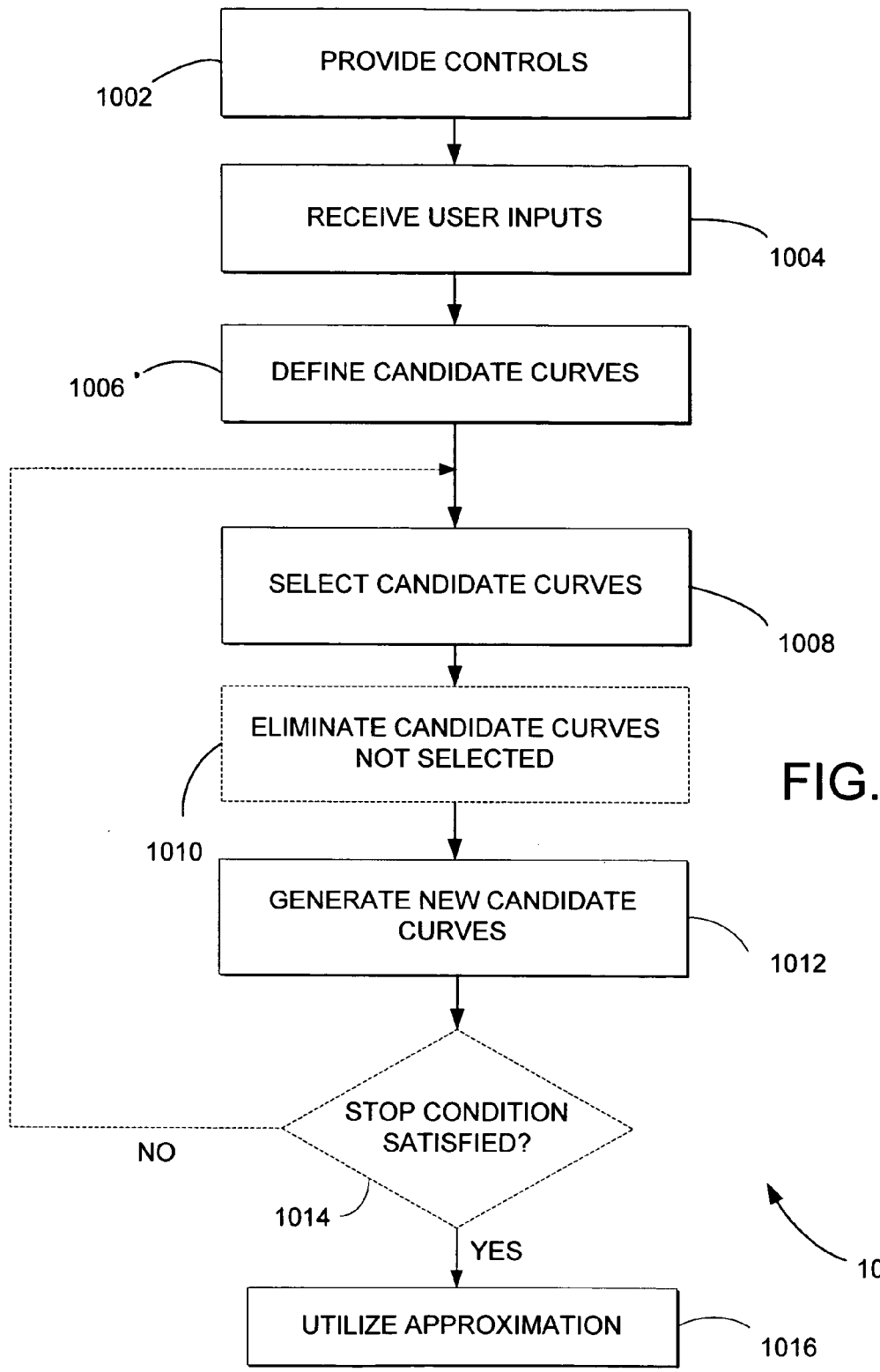
FIG. 10 illustrates a flowchart showing a method for providing a user interface allowing a user to edit a control curve in accordance with one embodiment of the present invention.

FIG. 10 illustrates a method 1000 for providing a user interface allowing a user to edit a control curve. At 1002, the method 1000 provides controls associated with an editable control curve, and at 1004, the method 1000 receives a user input related to the alteration of the editable control curve. As previously discussed, various embodiments of the present invention provide controls in which a user may define the shape of a curve associated with various editing parameters.

At 1006, an initial set of candidate approximation curves is defined. These candidate curves may be described in any number of ways. For example, each curve may be described by a plurality of X and Y coordinates (control points). These control points may define a curve such as a cubic spline. The curves may be randomly generated or may be created with reference to a selection algorithm. The selection algorithm may include logic designed to eliminate obviously poor approximations. Further, one objective of the selection algorithm may be to provide a sufficiently diverse sampling of candidate solutions. The selection algorithm may dictate that the control points must maintain a defined proximity to the control curve, though each control point need not reside on the control curve. The control points may also be selected based on the characteristics of the underlying approximation. For example, the optimal placement of control points for a cubic spline may be at local maximums (i.e. peaks of humps) and/or at points of inflection. Accordingly, the selection algorithm may seek to place control points at such locations. Those skilled in the art will recognize that any number algorithms or techniques may be acceptable for the generation of the initial population of curves in accordance with the present invention.

At 1008, a plurality of the candidate approximation curves is selected. According to one embodiment, the selected curves more acceptably approximate the control curve than the non-selected curves. To identify curves that acceptably approximate the user-altered control curve, the present invention may utilize a set of fitness criteria. Fitness criteria provide a standard by which the acceptability of a candidate approximation may be evaluated. Accordingly to one embodiment of the present invention, the set of fitness criteria is used to rank each candidate curve for acceptability. Following this ranking, a certain number of the candidate curves are identified as being the most acceptable and are selected at 1008. Optionally, at 1010, each candidate curve not selected is eliminated from the set of curves.

Any number of criteria may be used to determine the fitness of the candidate curves, and those skilled in the art will recognize that a variety of techniques exist in the art for measuring the degree which an approximation reflects a given shape or curve. The criteria may consider the total error or deviation between the two shapes and/or may consider the maximum error at any one local point. For example, even if an approximation accurately tracks the curve for the majority of its length, the approximation may be unacceptable if there is a localized segment in which the error is beyond a maximum threshold. Further, the fitness criteria may also be tailored based on the underlying utility and properties of the curve being approximated. For example, with certain editing parameters associated with visual images, if the approximation's slope is positive at a point while the desired curve's slope is negative, then undesirable visual effects may occur. In sum, the fitness criteria may include rules directed towards eliminating specific errors such as opposing slopes. Further, those skilled in the art will recognize that any number fitness criteria may be used with the present invention to evaluate the acceptability of the various candidate approximation curves.

At 1012, the method 1000 generates a plurality of new candidate approximation curves. Accordingly to one embodiment of the present invention, the new curves are generated from characteristics of the selected candidate curves. A variety of techniques exist for generating new curves from the characteristics of the selected curves. One such technique is called crossover (or recombination). A pair of selected candidate curves ("parent" curves) is chosen for the crossover. Selection may be random or may be biased towards elements of the initial generation. Following selection, the crossover (or recombination) operation is performed by combining characteristics of the two parent curves to generate a third curve. For example, if the parent curves are defined by a set of control points, the new curve may be created from a combination of control points from each parent. Thus, crossover results in a new candidate curve that has characteristics of at least two of the selected curves. This process may be repeated with different parent curves until there are an appropriate number of new candidate solutions.

Another technique to generate new curves from characteristics of the selected candidate curves is called mutation or jitter. This technique considers a single candidate curve and alters it in a small way. For example, one or more control points from a selected curve may be moved slightly to create a new candidate curve. Certain points may be locked so that they do not undergo mutation. The various mutations may be selected randomly or by a probabilistic determination. Those skilled in the art will recognize that as new curves are created from the selected curves, the average degree of fitness will increase in the set because only the best approximations from the population are selected for "breeding."

Optionally, at 1014, the method 1000 determines whether a stop condition is satisfied. A stop condition may be any criterion dictating that performance of the genetic algorithm should be terminated. In accordance with one embodiment, a stop condition considers whether the best-fit (i.e., the level of fitness associated with the most acceptable candidate) is still increasing over the various generations. If the level of increase is sufficiently small, then the candidate approximation associated with the best-fit may be deemed the optimal approximation.

When the stop condition is not satisfied, the method 1000 repeats steps 1008, 1010 and 1012. As previously discussed, the likely result of such repetition is increasingly fit sets of candidate curves. When the stop condition is satisfied, at 1016, the method 1000 utilizes the most acceptable or optimal candidate curve to approximate the user-altered control curve. This optimal approximation may used to implement the user-altered control curve as part of editing operations.

Figure 11:
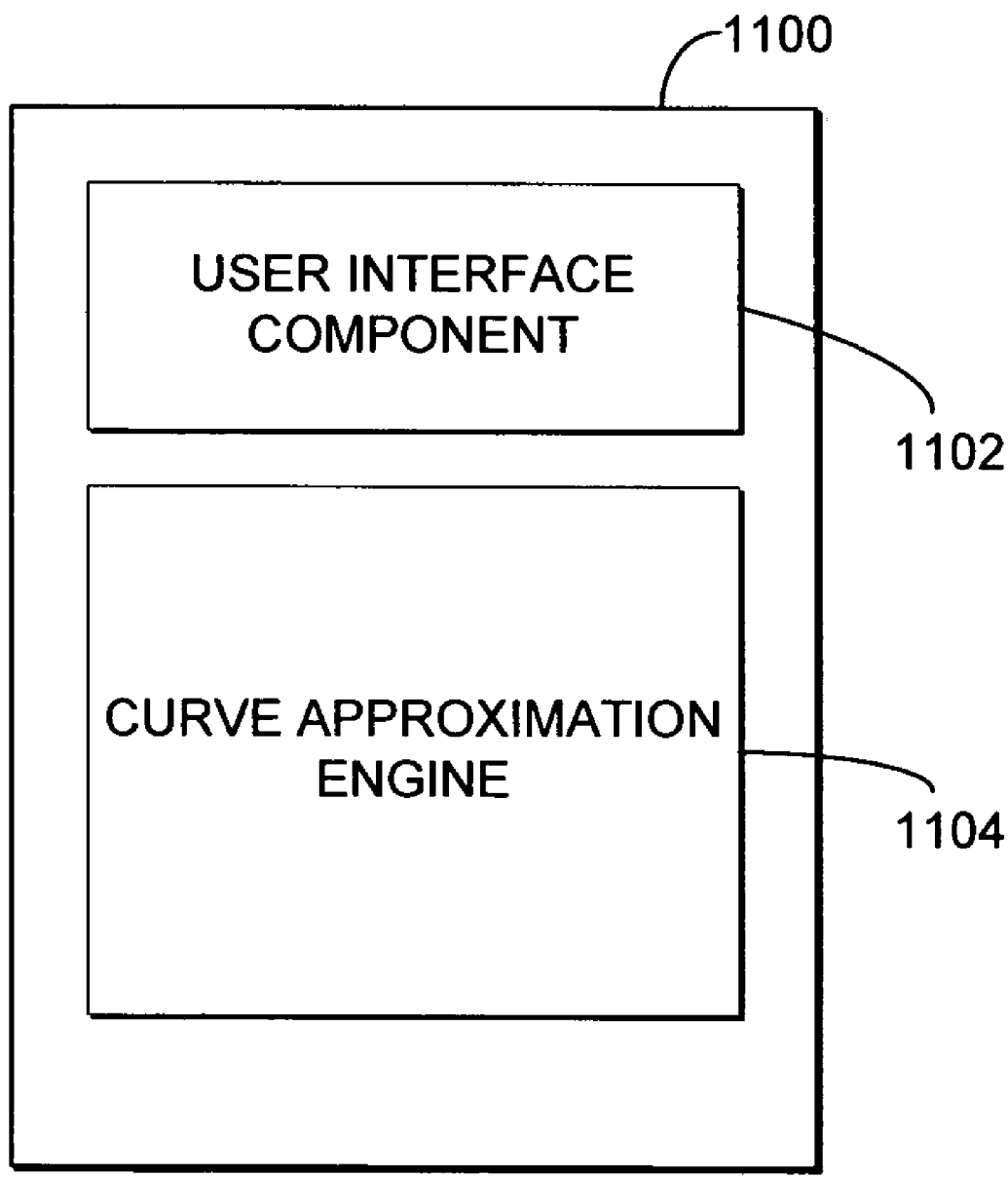
FIG. 11 illustrates a schematic diagram representing a system for providing an editable control curve in accordance with the one embodiment of the present invention.

FIG. 11 illustrates a system 1100 for providing an editable control curve in accordance with the present invention. The system 1100 may be implemented, for example, as part of a software application. The system 1100 includes a user interface component 1102. The user interface component 1102 presents a set of editing controls and may be configured to receive user inputs related to alteration of an editable control curve. For example, user interface component 1102 may include aspects of the previously discussed interfaces and controls that allow a user to define the shape of a curve associated with editing parameters. As will be understood by those skilled in the art, the user interface component 1102 may provide a wide variety of input options related to the manipulation of editable parameters and control curves.

The system 1100 also includes a curve approximation engine 1104 which is configured to generate an approximation of the editable control curve in response to a user input. According to one embodiment of the present invention, the approximation is used to generate a curve that is, ultimately, user-editable. The curve approximation engine 1104 may reside on a computer running a software application having instructions for generating approximation curves. Those skilled in the art will appreciate that the curve approximation engine 1104 may be any computing means capable of carrying out instructions for generating an approximation of the editable control curve. By carrying out such instructions, the curve approximation engine 1104 is operable to perform various tacks. According to one embodiment of the present invention, the curve approximation engine 1104 generates an optimal approximation of the user-altered curve. This approximation may be used by an application to edit or perform other operations on a set of content; the approximation may provide users with a familiar interface for further manipulating the curve and for allowing a higher degree of control and flexibility in content manipulation.

While any number of algorithms may be employed by the curve approximation engine 1104, one embodiment of the present invention performs a method based on a genetic algorithm to generate approximations. The method includes defining an initial set of candidate curves. The initial curves may be selected randomly or in accordance with a set of selection criteria.

After the initial candidate curves are defined, the curve approximation engine 1104 may evaluate and rank the curves according to a standard of acceptability. Any number of standards for acceptability (or fitness) may be used in this evaluation. In additional to standard mathematical techniques for comparing two curves, application-specific fitness criteria may be incorporated into the acceptability determination. By applying the fitness criteria to the set of candidate curves, the curves that most acceptably approximate the editable control curve may be identified and selected for further consideration. The method, for example, may dictate that a certain percentage of the candidate curves are selected based on their acceptability, while the remaining curves are disregarded.

Utilizing characteristics of the selected candidate curves, new candidate curves may be created by the curve approximation engine 1104. The previously discussed crossover technique may be employed to create a new curve from a combination of control points from selected candidate curves ("parent" curves). The previously discussed mutation (or jitter) technique may also be used to generate new curves from characteristics of the selected candidate curves. With mutation, a candidate curve is altered it in a small way, while certain points may be locked in place. Optionally, as previously discussed, the steps of evaluating candidate curves for acceptability, eliminating candidates for lack of fitness, and creating new candidates from selected, fit candidates may be repeated until a stop condition is achieved. Such a stop condition may indicate that a near-optimal candidate approximation has been achieved. Once such a near-optimal candidate approximation is identified, the curve approximation engine 1104 may communicate the approximation to other processes. These processes may implement the user-altered curve as part of editing operations.

Figure 12:
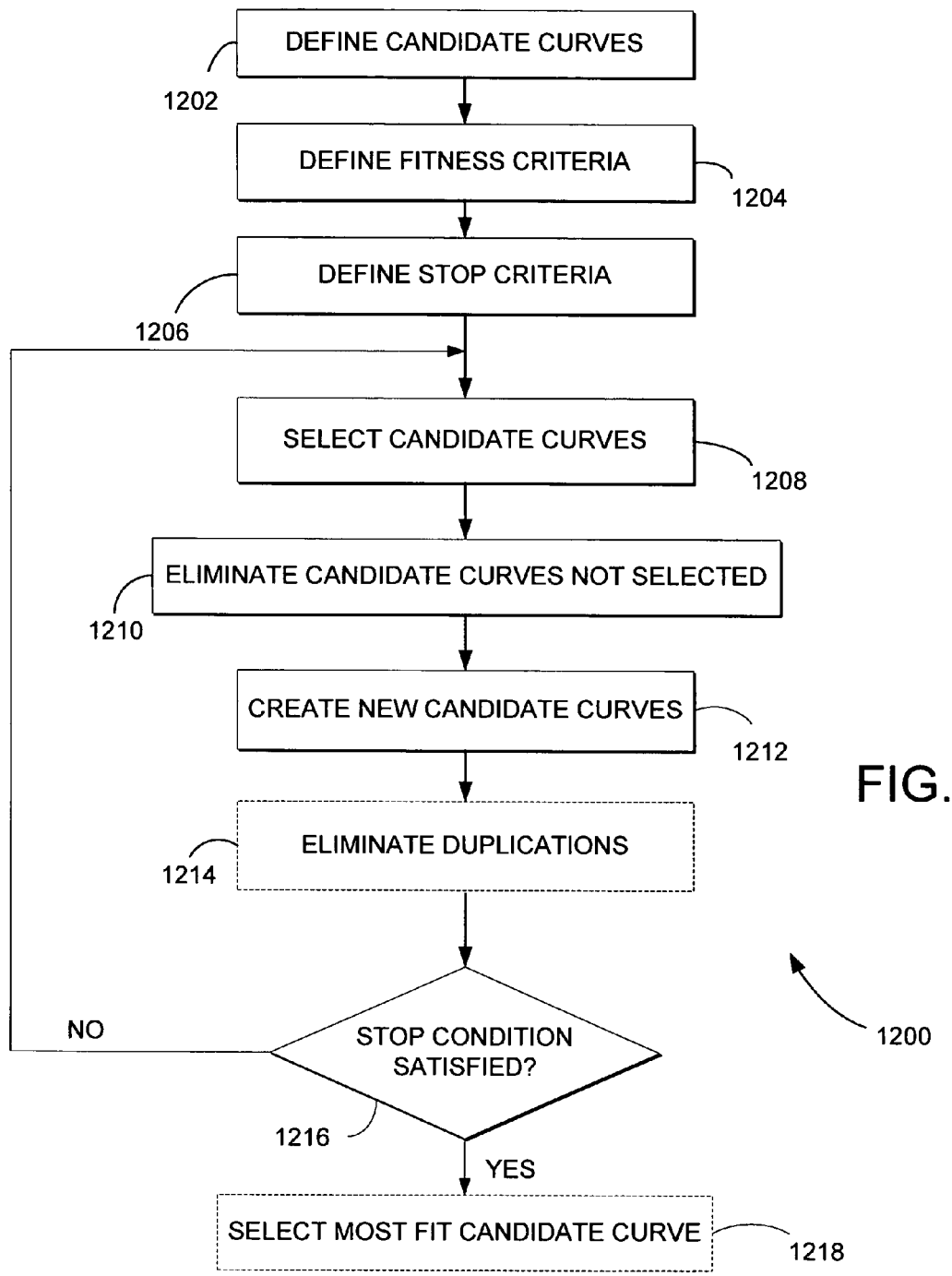
FIG. 12 illustrates a flowchart showing a method for generating a curve that approximates a defined shape in accordance with one embodiment of the present invention.

FIG. 12 illustrates a computer-implemented method 1200 for generating a curve that approximates a defined shape in accordance with one embodiment of the present invention. Those skilled in the art will recognize that the present invention may be useful in a variety of applications where a defined shape must be approximated. For example, the method 1200 may be used to approximate a shape altered by a user's inputs. As previously discussed, such shapes may take the form of user-editable control curves.

At 1202, the method 1200 defines a set of candidate curves. These candidate curves may be described in any number of ways. For example, each curve may be described as an array of control points. The initial set of candidate approximation curves may be selected in accordance with any number of techniques. The initial curves may be randomly generated. In defining the set of candidate curves, a selection algorithm may be utilized. Such an algorithm, for example, may dictate that each of a candidate curve's control points be within a defined proximity to the defined shape. The candidate curves may also be selected based on the characteristics of the underlying approximation. Those skilled in the art will recognize that any number of algorithms or techniques may be acceptable for the generation of the initial population of curves.

At 1204, the method 1200 defines a set of fitness criteria for evaluating how acceptably a candidate curve approximates the defined shape. The fitness criteria may also provide a standard for ranking the candidate curves. The set of fitness criteria may incorporate techniques known in the art for measuring the degree which an approximation reflects a given shape. For example, the set of fitness criteria may consider the total error or deviation between the two shapes and/or may consider the maximum error at any one local point. Further, the set of fitness criteria may also include considerations reflecting the underlying uses of the shape being approximated. Those skilled in the art will recognize that any number of fitness criteria may be used with the present invention to evaluate the acceptability of the various candidate approximation curves.

A set of stop conditions is defined at 1206. A stop condition may be any criterion that indicates that an acceptable approximation of the defined shape has been achieved. In accordance with one embodiment, one of the stop conditions compares the most acceptable candidate curve to the defined shape and determines differences between the two shapes. The stop condition, for example, may define a maximum error or derivation between the two shapes. Those skilled in the art will appreciate that any number of stop conditions may be acceptable for use with the present invention.

At 1208, the set of fitness criteria is utilized to select the curves that most acceptably approximate the defined shape. According to one embodiment of the present invention, the set of fitness criteria is used to rank each candidate curve for acceptability. Following this ranking, a certain percentage of the candidate curves are identified as being the most acceptable and are selected. Further, at 1210, each candidate curve not selected is eliminated from the set of candidate curves.

At 1212, the method 1200 adds a plurality of new candidate curves to the set of candidate curves. According to one embodiment of the present invention, the new curves are generated from characteristics of the selected candidate curves. A variety of techniques exist for generating the new curves from the characteristics of the selected curves. A new curve, for example, may be generated by combining characteristics of two or more selected curves to yield the new curve. Also, a new curve may result from altering one or more characteristics of one of the existing candidate curves. Once the new curves are added to the set of candidate curves, at 1214, the method 1200 optionally eliminates any duplications that exist in the set of curves.

At 1216, the method 1200 determines whether at least one of the stop conditions is satisfied. When none of the stop conditions are satisfied, the method 1200 repeats steps 1208, 1210, 1212 and (optionally) 1214. As previously discussed, the likely result of such repetition is an increasingly fit set of candidate curves. When a stop condition is satisfied, at 1218, the method 1200 utilizes the most acceptable or optimal candidate curve to approximate the defined shape.

The foregoing description of the invention is illustrative, and modifications in configuration and implementation will occur to persons skilled in the art. For instance, while the invention has generally been described in terms of a set of dynamically interactive controls implemented in a processing application 108, in embodiments similar controls or groupings of controls may be implemented or embedded in other applications or platforms, such as video processing applications, publishing applications, integrated applications or suites, or other applications or platforms.

Similarly, while the invention has in embodiments been generally described as assimilating color editing functions and exposure editing functions as two broad classes of functionality in which parametric groupings may be vertically incorporated, in embodiments other categories or types of functions may be used. Other hardware, software or other resources described as singular may in embodiments be distributed, and similarly in embodiments resources described as distributed may be combined. The scope of the invention is accordingly intended to be limited only by the following claims.

We claim:

1. A method for providing a user interface that allows a user to alter a curve, said method comprising:
   providing one or more controls associated with said curve;
   receiving a user input to one or more of said one or more controls, wherein said user input relates to altering said curve;
   defining a plurality of candidate sets of control points;
   utilizing one or more characteristics of at least one of said plurality of candidate sets of control points to define one or more new candidate sets of control points for inclusion in said plurality of candidate sets of control points;
   creating an approximation of said curve by selecting one of said plurality of candidate sets of control points; and
   altering one or more visual attributes of a digital image by utilizing said approximation.

2. The method of claim 1, wherein defining said plurality of candidate sets of control points includes consideration of one or more properties of said curve.

3. The method of claim 1, further comprising utilizing a set of fitness criteria to compare each of said plurality of candidate sets of control points with said curve.

4. The method of claim 1, further comprising repeating said utilizing until a stop condition is achieved.

5. The method of claim 1, wherein at least a portion of said one or more new candidate sets of control points is created by combining one or more characteristics from two or more of said plurality of candidate sets of control points.

6. The method of claim 1, wherein at least a portion of said new candidate sets of control points is created by altering one or more characteristics of at least one selected candidate set of control points.

7. The method of claim 1, further comprising determining an optimal set of control points, wherein said optimal set of control points is the candidate set of control points which defines a spline that provides the closest representation of said curve.

8. One or more computer-readable media storing computer-executable instructions thereon to perform the method of claim 1.

9. A system for providing an editable curve, the system comprising:
 a user interface component that presents a set of editing controls and that is configured to receive user inputs related to alteration of said editable curve; and
 a curve approximation engine that creates an approximation of said editable curve by selecting one of a plurality of candidate sets of control points, wherein said curve approximation engine is configured to utilize one or more characteristics of said plurality of candidate sets of control points to generate at least a portion of said plurality of candidate sets of control points.

10. The system of claim 9, wherein said editable curve is an imaging control curve.

11. The system of claim 9, wherein said curve approximation engine is further configured to output a spline defined by one of said plurality of candidate sets of control points.

12. The system of claim 9, wherein said curve approximation engine is further configured to select a portion of said plurality of candidate sets of control points, wherein each of said selected candidate sets of control points more closely approximates said editable curve than each of said candidate sets of control points not selected.

13. The system of claim 12, wherein at least a portion of said plurality of candidate sets of control points are generated from one or more characteristics of at least one of said selected candidate sets of control points.

14. The system of claim 9, wherein said stop condition indicates that the difference between at least one of said plurality of candidate sets of control points and said editable curve is smaller than a predetermined maximum difference.

15. A computer-implemented method for generating a set of control points that approximates a defined shape, said method comprising:
 (a) defining candidate sets of control points;
 (b) defining a set of fitness criteria for evaluating differences between one of said candidate sets of control points and said defined shape;
 (c) defining one or more stop conditions;
 (d) utilizing said set of fitness criteria to select a plurality of sets of control points from said candidate sets of control points, wherein each of said selected sets of control points approximates the defined shape more closely than each of said candidate sets of control points not selected;
 (e) eliminating each of said candidate sets of control points not selected from said candidate sets of control points;
 (f) adding a plurality of new candidate sets of control points to said candidate sets of control points, wherein at least a portion of said plurality of new candidate sets of control points are created from one or more characteristics of at least one of said candidate sets of control points;
 (g) repeating said steps (d)-(f) until at least one of said stop conditions is satisfied;
 (h) creating an approximation of said defined shape by selecting one set of control points from said candidate sets of control points; and
 (i) altering one or more visual attributes of a digital image by utilizing said approximation.

16. The computer-implemented method of claim 15, wherein said defined shape is an editable curve.

17. The computer-implemented method of claim 15, further comprising utilizing a spline defined by at least one of said candidate sets of control points to implement one or more controls in a processing application.

18. One or more computer-readable media storing computer-executable instructions thereon to perform the method of claim 15.

* * * * *